April 18, 1939.  J. L. FERGUSON  2,155,306
CONVEYER
Filed June 9, 1937

Inventor:
John L. Ferguson
By Ames, Phillips, Olson & Mecklenburger
Attys.

Patented Apr. 18, 1939

2,155,306

UNITED STATES PATENT OFFICE 2,155,306

CONVEYER

John L. Ferguson, Joliet, Ill., assignor to J. L. Ferguson Company, Joliet, Ill., a corporation of Illinois Application June 9, 1937, Serial No. 147,167

7 Claims. (Cl. 198—175)

This invention relates to conveyers and more particularly to chain conveyers having easily attachable and detachable flights thereon, adapted to move cartons and the like, although the invention is, of course, adaptable for many uses not herein enumerated.

The invention is particularly intended to provide chain conveyers having flights held in operative position on the chains without the use of any additional elements other than the flights and the usual chain links, and particularly in which the mounting means preferably forming an integral part of each flight is so arranged that the links are not restricted in their angular movement relative to each other. The invention enables the use of very small sprockets, the size of which are limited only by the normal requirements of the chain itself.

A further object is the provision of a unique flight construction for attachment to the usual conveyer chains whereby the flights may easily be mounted on the chains and which is adaptable for use with single chain conveyers, or with double chain conveyers on which transverse flights may be provided.

Another object is the provision of flights for mounting on chain conveyers in which there are no projecting elements or portions to interfere with the sprockets or with enclosing guides for the chains and which will permit the use of screws or mounting bolts having projecting heads, to be used for mounting the guides.

A further object is the provision of a chain conveyer having interchangeable flights which may be positioned at desired points on the usual chain or chains to provide predetermined spacing therebetween and without dispensing with any of the chain links or other chain elements, and in which the flights may be retained in operative position solely by interlocking engagement with adjacent links.

It is also an object to provide a conveyer comprising a chain and flights of the character described in which the conveyer chain may be provided with a suitable housing and guide, and will be quiet in operation, and may be positioned for operation in any desired plane.

A further object is the provision of a conveyer and flights therefor, which will be simple in construction, cheap to manufacture, easy to assemble and which will not easily get out of order.

Further objects will be apparent from the specification and the appended claims.

Figure 1:
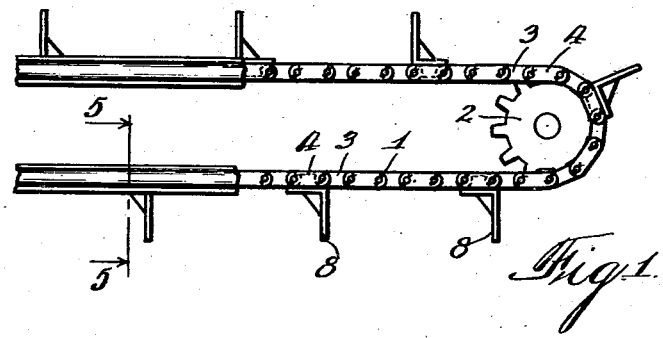
Fig. 1 is a top view of a horizontal single chain conveyer and illustrates one embodiment of the invention.
Figure 2:
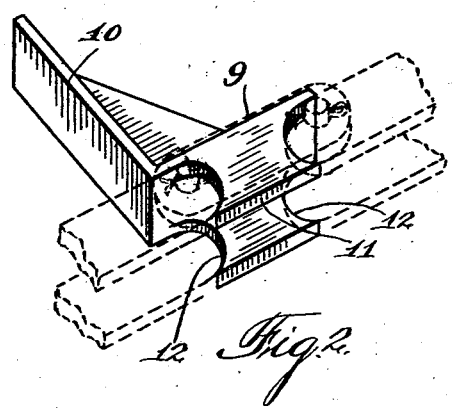
Fig. 2 is a perspective view of one of the flights shown in Fig. 1, with the chain illustrated in dotted lines.

Referring to the drawing in detail the embodiment illustrated in Figs. 1 to 5 inclusive comprises the usual chain conveyer 1 supported on a suitable sprocket 2. As previously stated the invention is particularly adapted for use with sprockets of small diameter and it is important that the chain and flight thereon should follow the sprocket in the usual manner, that is, the sprocket should drive the chain or vice versa, in the usual manner, and the flight or mounting means thereon should not interfere with the normal functioning of the chain and sprocket.

The chain 1 may comprise the usual flat inner links 3 and flat outer links 4 and these links may be secured together in the usual manner by means of pins 5 and cotter pins 6. The pins 5 may be provided with rollers 7 for engagement with the sprocket teeth. The links are provided with the usual rounded ends. Flights 8 may be mounted between the links as illustrated and these flights may comprise a body portion 9 having an outwardly extending flight portion 10 integral therewith or secured thereto. The flights are provided with suitable inwardly extending flanges 11 having concave ends 12 conforming in contour with the arcuate ends of the inner links 3. The flanges 11 are spaced the same distance apart as the inner links 3, and may be substantially the same width and thickness. In order to assemble the flights on the chain it is only necessary to remove one of the outer links 4 and place the flight in position with the flanges 11 between the ends of the inner links 3 as illustrated, and the outer link 4 may then be replaced on the pins 5 and secured thereon by means of the cotter pins 6.

It will be apparent that the flights will be securely held between the ends of the inner links with each flange and associated links 3 in the same plane but the flanges will not interfere with the normal action of the links and sprocket and a special sprocket is not required.

Figure 5:
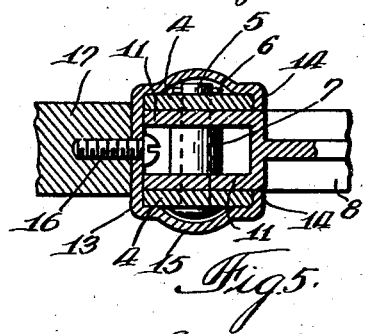
Fig. 5 is a transverse sectional view through the chain and combined guide and housing therefor, and is taken on a line substantially corresponding to line 5—5 of Fig. 1.

In using these chain conveyers it is preferable to provide suitable guides for the chains. Fig. 5 illustrates a type of guide which is particularly adapted for the purpose and comprises a sheet metal track or combined housing and guide member 13 which may be U-shaped in cross section and provided with inturned flanges 14 engaging the outer edges of the outer links 4. The sides of the guides are formed outwardly at 15 to provide clearance for the ends of the chain pins 5. This type of guide as well as the method of mounting the flights provides for very quiet operation of the conveyer. Heretofore it has usually been necessary to mount the guides by means of countersunk screws in order that there would be no projecting heads which would be engaged by the usual flights which enter between the links of the chain and are either bolted or riveted thereto, or may themselves form links.

In the embodiment as illustrated in Fig. 5, the mounting flanges 11 are aligned with the inner links 3 and therefore ordinary round head screws 16 may be used to secure the guides as there is no obstruction between the flanges or between the links. The guide may be secured to any convenient part of the machine, such as the member 17.

Figure 6:
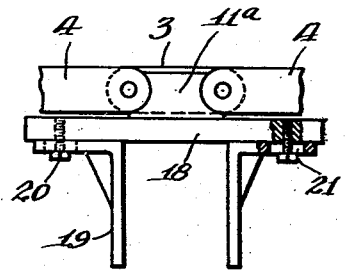
Fig. 6 is a top plan view of a slightly modified form of flight mounted on a chain with the adjacent outside link of the chain removed.

Fig. 6 illustrates a slightly different embodiment of the device in which the flight comprises an elongated base 18 having flanges 11a similar to the flanges 11 previously described. Outwardly extending adjustable flight brackets 19 may be secured to the base 18 by means of screws or bolts 20. The brackets may be provided with slots 21 whereby they may be adjusted to engage a desired size of container therebetween.

Figures 3, 7:
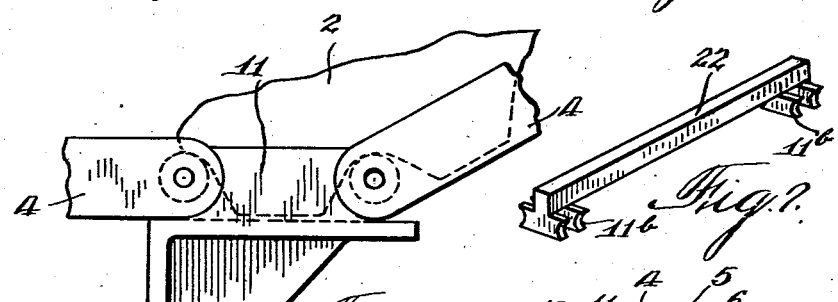
Fig. 3 is a top plan view illustrating one of the flights as applied to a chain with the adjacent outside link removed and illustrates the relationship of the flight and chain to the usual sprocket.
Fig. 7 is a perspective view of a flight particularly adapted for use in connection with double chain conveyers.
Figure 4:
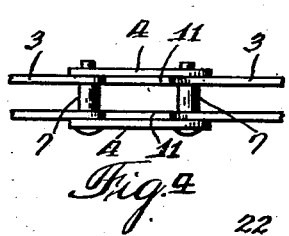
Fig. 4 is a rear view of the chain and flight thereon.
Figure 8:
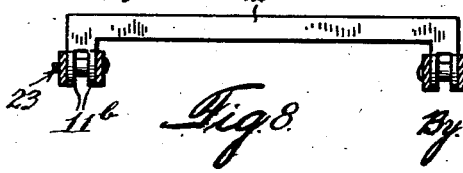
Fig. 8 is a transverse sectional view through a double chain conveyer and illustrates the flight shown in Fig. 7 mounted thereon.

Fig. 7 is a perspective view of a slightly different embodiment of the invention which is particularly adapted for use with double chain conveyers. This embodiment comprises an elongated flight 22 provided at each end with downwardly extending flanges 11b. The flanges may correspond in every particular with the previously described flanges 11 and are arranged to be mounted in the same manner between the inner links of the spaced chains 23 as illustrated in Fig. 8. The method of mounting this elongated flight on the chain is the same as previously described for the single chain.

It will be apparent that the invention provides an extremely simple construction whereby flights may be mounted on ordinary conveyer chains without the use of means other than the flights and chains themselves, and in which the flight will not interfere with the normal operation of the chain around the smallest practical sprocket. Also, the chain will freely operate in a combined housing and guide such as illustrated in Fig. 5. This type of guide is particularly desirable as it forms an efficient lubricant retainer.

It will be apparent that the flanges 11 of the flight may be somewhat farther apart if desired so that they may be positioned outside the inner links 3 and in alignment with the outer links 4 and between the arcuate ends thereof. However, the construction previously described is preferable particularly for use in connection with a guide such as shown in Fig. 5, also it provides for somewhat easier assembly.

Modifications may be made by those skilled in the art without departing from the spirit of invention. It is therefore desired that the invention be limited only by the prior art and the scope of the appended claims.

Having thus described this invention, what is claimed and desired to be secured by Letters Patent is:

1. In a conveyer of the character described, a chain of the roller sprocket type comprising link members having overlapping ends secured together by suitable pivot pins, a flight having a portion extending between alternate links and in longitudinal alignment therewith, said portion substantially filling the space between said longitudinally aligned link ends and interlocking therewith in a manner to permit free angular movement of said links and enable the normal co-operation of a sprocket with said chain without increasing the width thereof.

2. A conveyer chain flight for roller sprocket chains of the character described comprising a base substantially the width of the chain, a pair of flanges on said base and spaced apart for longitudinal alignment with the inner links of a conveyer chain to enable a sprocket to enter therebetween, said flanges being arranged to extend between the adjacent ends of said inner links and having ends conforming in contour with the ends of said links and engageable therewith to provide a bearing whereby the flight is retained in operative position without materially restricting the movement of the chain links.

3. A flight for a conveyer chain of the roller type described comprising a body portion and two spaced flanges having their ends conforming to the arcuate spaced ends of adjacent laterally spaced inner links of a conveyer chain, said flanges being in the same plane as adjacent inner links and substantially the same thickness, whereby the flanges may be mounted between the outer links of the chain and retained thereby without interfering with the normal angular movement of the links nor with the normal co-operation of an ordinary sprocket therebetween.

4. A flight for a conveyer chain of the roller type described comprising a body portion having spaced flanges substantially the same thickness as the chain links, each of said flanges being arranged to be mounted between lonigtudinally aligned links of said chain and in the same plane therewith, the ends of said flanges conforming in contour with the ends of the longitudinally aligned links whereby said flight may be retained in operative position on said chain while permitting normal angular movement of said links and normal co-operation with a sprocket.

5. A flight for a conveyer chain of the roller type described comprising an outwardly extending flight portion, and a longitudinal base substantially the same length as a chain link, inwardly extending flanges on said base and spaced for longitudinal alignment with the inner links of said chain and substantially filling the space between the adjacent ends of alternate links, said flanges being substantially the same thickness as said links and having arcuate ends with a radius substantially equal to the radius of the ends of said links, whereby to enable normal operation of said chain on the usual sprocket.

6. A flight for a conveyer chain of the roller type described comprising a base, a pair of flanges spaced laterally substantially the same as the two inner series of links in said chain and substantially the same thickness to enable the usual operation of a sprocket therebetween, the ends of said flanges being arcuate to provide a working fit between two pairs of said inner series of links whereby said flanges may be moved laterally into alignment with said links when only the adjacent link of the outer series on one side of said chain is removed.

7. A double chain conveyer comprising spaced sprocket chains of the flat link type described, a transverse flight connecting said chains and having a pair of flanges of substantially the same thickness as said chain links adjacent each end thereof and of a contour substantially the same as the longitudinal space between an alternate pair of aligned links, said flanges being spaced transversely to substantially fill said spaces and enable free operation of a sprocket therebetween and retained therein by interlocking engagement with said links.

JOHN L. FERGUSON.